United States Patent
Emek et al.

(10) Patent No.: US 7,409,377 B2
(45) Date of Patent: Aug. 5, 2008

(54) ACCELERATED SOLUTION OF CONSTRAINT SATISFACTION PROBLEMS BY PARTITIONING OF THE VARIABLE SPACE

(75) Inventors: Roy Emek, Tel Aviv-Jaffa (IL); Itai Jaeger, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 11/092,000

(22) Filed: Mar. 29, 2005

(65) Prior Publication Data

US 2005/0222827 A1 Oct. 6, 2005

(30) Foreign Application Priority Data

Mar. 31, 2004 (GB) .................. 0407260.9

(51) Int. Cl.
*G06F 17/00* (2006.01)
*G06E 1/00* (2006.01)
*G05B 19/00* (2006.01)

(52) U.S. Cl. .............. 706/46; 706/19; 706/23; 700/246; 700/250

(58) Field of Classification Search ............... 706/45, 706/19, 46; 717/106
See application file for complete search history.

(56) References Cited

U.S. PATENT DOCUMENTS

| | | | | |
|---|---|---|---|---|
| 5,195,172 A * | 3/1993 | Elad et al. | ...... | 706/62 |
| 5,267,346 A * | 11/1993 | Maruyama et al. | ...... | 706/62 |
| 5,410,496 A * | 4/1995 | Bolon et al. | ...... | 703/7 |
| 5,617,510 A * | 4/1997 | Keyrouz et al. | ...... | 706/45 |
| 5,636,328 A * | 6/1997 | Kautz et al. | ...... | 706/45 |
| 5,640,491 A * | 6/1997 | Bhat et al. | ...... | 706/25 |
| 5,855,009 A * | 12/1998 | Garcia et al. | ...... | 706/45 |
| 5,893,083 A * | 4/1999 | Eshghi et al. | ...... | 706/45 |
| 5,963,939 A * | 10/1999 | McCann et al. | ...... | 707/4 |
| 6,031,984 A * | 2/2000 | Walser | ...... | 703/2 |
| 6,063,126 A * | 5/2000 | Borduin | ...... | 703/2 |
| 6,272,483 B1 * | 8/2001 | Joslin et al. | ...... | 706/62 |
| 6,336,110 B1 * | 1/2002 | Tamura et al. | ...... | 706/46 |
| 6,456,996 B1 * | 9/2002 | Crawford et al. | ...... | 707/1 |
| 6,526,420 B2 * | 2/2003 | Borowsky et al. | ...... | 707/205 |
| 6,539,345 B1 * | 3/2003 | Jones et al. | ...... | 703/15 |

(Continued)

OTHER PUBLICATIONS

Merchez et al., "AbsCon: A Prototype to Solve CSPs with Abstraction", 2001, Springer-Verlag Berlin Heidelberg, CP 2001, LNCS 2239, pp. 730-744.*

(Continued)

*Primary Examiner*—David Vincent
*Assistant Examiner*—Melissa J Berman
(74) *Attorney, Agent, or Firm*—Louis P. Herzberg

(57) ABSTRACT

Methods, systems and apparatus for modeling a target system includes defining a constraint satisfaction problem (CSP) that characterizes the target system in terms of a set of variables, each having a respective input domain, and initial constraints applicable to the variables. The variables are partitioned into at least first and second sets. An abstract solution is found to the CSP, including a given assignment of the variables in the first set. A reduced domain of at least one of the variables in the second set is computed, so as to be compatible with the abstract solution. A redundant constraint on the abstract solution is determined responsively to the reduced domain. A concrete solution to the CSP is then found, using the abstract solution and the redundant constraint.

30 Claims, 4 Drawing Sheets

U.S. PATENT DOCUMENTS

| | | | | |
|---|---|---|---|---|
| 6,556,978 B1* | 4/2003 | Ginsberg et al. | | 706/19 |
| 6,816,825 B1* | 11/2004 | Ashar et al. | | 703/14 |
| 6,856,980 B2* | 2/2005 | Feldman et al. | | 706/47 |
| 6,865,562 B2* | 3/2005 | Fromherz et al. | | 706/14 |
| 6,912,515 B2* | 6/2005 | Jackson et al. | | 706/19 |
| 7,003,360 B1* | 2/2006 | Dillon | | 700/97 |
| 7,016,934 B2* | 3/2006 | Kawamura et al. | | 709/202 |
| 7,062,729 B2* | 6/2006 | Gray et al. | | 716/3 |
| 7,085,748 B2* | 8/2006 | Emek et al. | | 706/14 |
| 7,089,220 B2* | 8/2006 | Fromherz et al. | | 706/45 |
| 2002/0062297 A1* | 5/2002 | Mizokawa | | 706/15 |
| 2002/0156751 A1* | 10/2002 | Takagi et al. | | 706/12 |
| 2002/0198697 A1* | 12/2002 | Datig | | 704/1 |
| 2003/0144975 A1* | 7/2003 | Kawamura et al. | | 706/45 |
| 2005/0004710 A1* | 1/2005 | Shimomura et al. | | 700/246 |
| 2005/0021486 A1* | 1/2005 | Naveh | | 706/46 |

OTHER PUBLICATIONS

Lecoutre et al., "A CSP Abstraction Framework", 2000, Springer-Verlag Berlin Heidelberg, SARA 2000, LNAI 1864, pp. 164-184.*
Choueiry et al., "Using Abstractions for Resource Allocation", 1995, IEEE International Conference on Robotics and Automation.*

* cited by examiner ated Solution

ACCELERATED SOLUTION OF CONSTRAINT SATISFACTION PROBLEMS BY PARTITIONING OF THE VARIABLE SPACE

PRIORITY

This application claims priority to application of Great Britain, Serial No. GB/0407260.9, having a Filing Date of 31 Mar. 2004.

FIELD OF THE INVENTION

The present invention relates generally to methods and systems for solving constraint satisfaction problems, and specifically to accelerating the solution of such problems by partitioning of the variable space.

BACKGROUND OF THE INVENTION

Many of the tasks that are addressed by decision-making systems and artificial intelligence can be framed as constraint satisfaction problems (CSPs). In this framework, the task is specified in terms of a set of variables, each of which can assume values in a given domain, and a set of predicates, or constraints, that the variables must simultaneously satisfy. The set of variables and constraints is referred to as a constraint network. Each constraint may be expressed as a relation, defined over some subset of the variables, denoting valid combinations of their values. A solution to the problem (referred to hereinbelow as a "concrete solution") is an assignment of a value to each variable from its domain that satisfies all of the constraints.

Constraint satisfaction methods have been found useful in a variety of applications, including:
Artificial intelligence
Robotic control
Temporal reasoning
Natural language parsing
Spatial reasoning
Test-case generation for software and hardware systems
Machine vision
Medical diagnosis
Resource allocation
Crew scheduling
Time tabling
Frequency allocation
Graph coloring.

For example, Bin et al. describe a constraint satisfaction method for use in automated generation of test programs, in a paper entitled "Using a Constraint Satisfaction Formulation and Solution Techniques for Random Test Program Generation," *IBM Systems Journal* 41:3 (2002), pages 386-402, which is incorporated herein by reference. The authors show how random test program generation can be modeled as a CSP, and they describe a set of solution techniques that are used in practical test-case generation tools.

A number of constraint satisfaction systems are described in the patent literature. For example, U.S. Pat. No. 5,636,328, whose disclosure is incorporated herein by reference, describes methods and apparatus for finding values that satisfy a set of constraints, applied particularly to control of a robotic arm. U.S. Pat. No. 5,617,510, whose disclosure is also incorporated herein by reference, describes a method, useful in computer-aided design, of identifying possible solutions to an over-constrained system having a collection of entities and constraints.

One drawback of modeling based on constraint satisfaction is that general solution methods have worst-case exponential time performance. In response to this difficulty, Weigel et al. have proposed a method based on "compiling" partial solutions to a CSP, in "Compiling Constraint Satisfaction Problems," *Artificial Intelligence* 115:2 (1999), pages 257-287. General tasks are defined by incomplete CSPs, from which instances are generated by adding more constraints. For any such general task, compilation of the unchanging parts of the CSP builds a structure which represents all its solutions in a condensed manner. When instances are derived from the general task by adding constraints, their solution spaces are always subsets of those of the general task. Thus, the solutions can be found by searching in this reduced search space while applying the additional constraints.

SUMMARY OF THE INVENTION

Embodiments of the present invention provide improved methods and systems for solving CSPs. These methods are based on partitioning the variables in the CSP into at least two sets. Typically, for efficient solution, variables that have a large impact on the structure of the CSP are assembled in the first set, also referred to hereinbelow as the set of "abstract" variables. For example, when the CSP is used to model a target system such as an electronic circuit under design or test, the first set of variables may define the components in the circuit and their configuration. A second set of variables, also referred to as "concrete" variables, may then define the addresses and data values on which the components are expected to operate. In cases such as this, the constraints on the variables in the first set are more or less fixed by the definition of the target system. The input domains and other constraints on the variables in the second set may be varied in order to provide multiple concrete CSPs, which model different operating conditions of the system. Based on this partitioning of the variables, the solution of the CSP is divided into static and dynamic phases.

There is therefore provided, in accordance with an embodiment of the present invention, a method for modeling a target system, including: defining a constraint satisfaction problem (CSP) that characterizes the target system in terms of a set of variables, each having a respective input domain, and initial constraints applicable to the variables; partitioning the variables into at least first and second sets; finding an abstract solution to the CSP including a given assignment of the variables in the first set; computing a reduced domain of at least one of the variables in the second set that is compatible with the abstract solution; determining a redundant constraint on the abstract solution responsively to the reduced domain; and finding a concrete solution to the CSP, using the abstract solution and the redundant constraint.

BRIEF DESCRIPTION OF THE DRAWINGS

The present invention will be more fully understood from the following detailed description of the embodiments thereof, taken together with the drawings, in which.

DETAILED DESCRIPTION OF INVENTION

Figure 1:
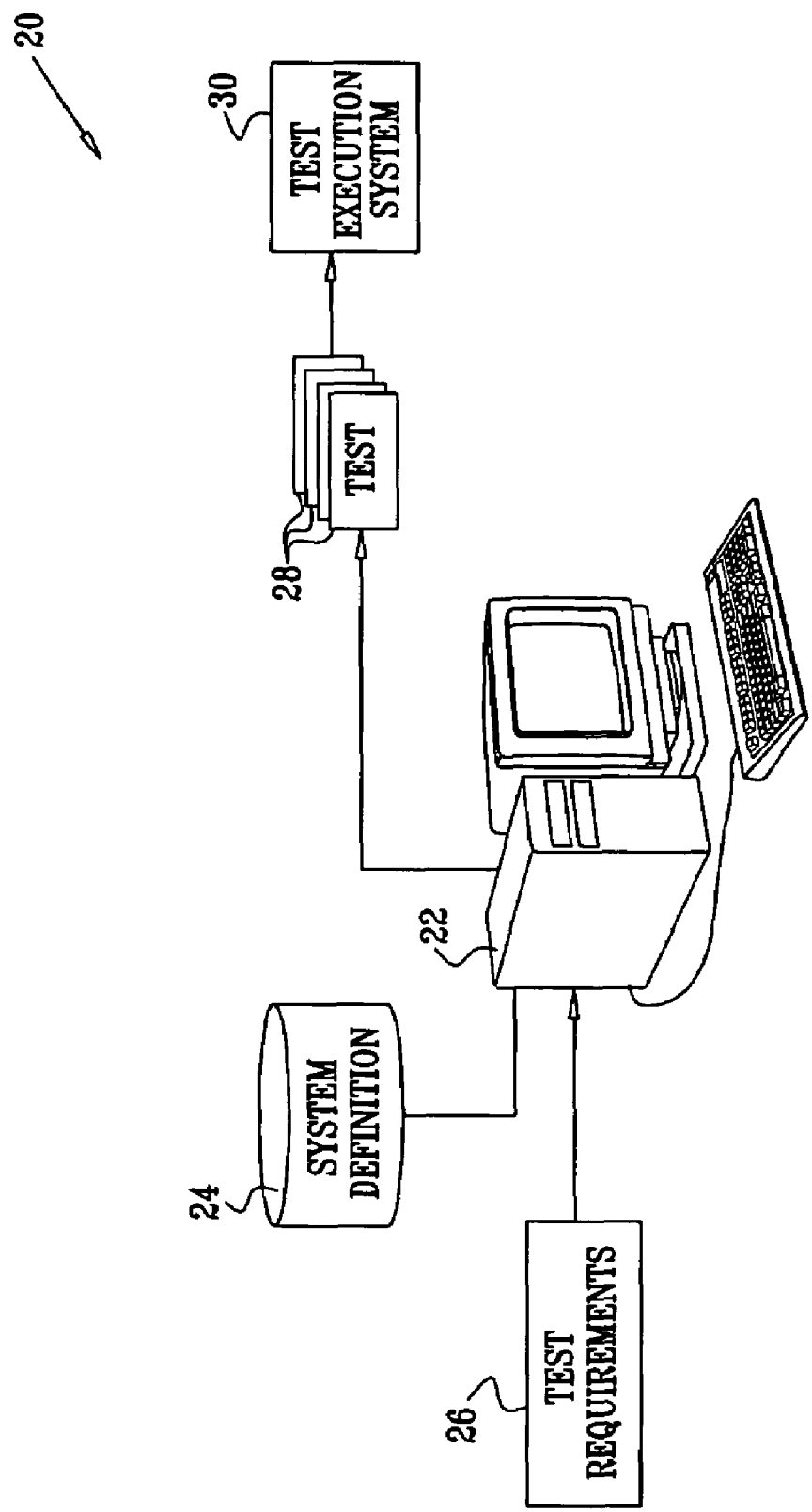
FIG. 1 is a block diagram that schematically illustrates a system for automatic test case generation based on CSP solving, in accordance with an embodiment of the present invention.

The present invention provides improved methods and systems for solving constraint satisfaction problems, CSPs. These methods are based on partitioning the variables in the CSP into at least two sets. Typically, for efficient solution, variables that have a large impact on the structure of the CSP are assembled in the first set, also referred to hereinbelow as the set of "abstract" variables. For example, when the CSP is used to model a target system such as an electronic circuit under design or test, the first set of variables may define the components in the circuit and their configuration. A second set of variables, also referred to as "concrete" variables, may then define the addresses and data values on which the components are expected to operate. In cases such as this, the constraints on the variables in the first set are more or less fixed by the definition of the target system. The input domains and other constraints on the variables in the second set may be varied in order to provide multiple concrete CSPs, which model different operating conditions of the system.

Based on this partitioning of the variables, the solution of the CSP is divided into static and dynamic phases. First, in the static phase, a CSP solver finds one or more "abstract solutions" of the CSP. Each abstract solution comprises a complete assignment of the abstract variables within their respective input domains. The assigned values of the abstract variables are used to compute the (reduced) domains of the concrete variables that are compatible with each abstract solution, and to determine the constraints that are applicable to the concrete variables for each abstract solution. An arc consistency procedure, as described hereinbelow, is typically applied to reduce the domains of the concrete variables still further. The reduced domains are used in determining one or more redundant constraints for each abstract solution. In the case of the circuit testing application mentioned above, the redundant constraints embody general knowledge about the circuit design that can be applied in generating multiple test cases, each of which is a specific concrete solution to the CSP.

During the dynamic phase, the CSP solver uses the abstract solutions and the applicable redundant constraints, together with additional constraints that may be imposed on the concrete variables, in order to find concrete solutions to the CSP. Typically, the additional constraints are input by a user of the CSP solver. For example, in order to generate test cases for the above-mentioned electronic circuit, the user may specify particular data values or address ranges to be tested. Each concrete solution found by the CSP solver comprises an assignment of each of the variables in the second set, wherein the assignment is compatible with all the original constraints (including the redundant constraints) and with the additional constraints. The CSP solver uses the redundant constraints to reduce the search space a priori, so that it can find the specific concrete solutions more efficiently. In many cases, for a given abstract solution, the redundant constraints and the additional constraints are incompatible, for example, there is at least one variable in the second set whose reduced domain (based on the abstract solution) fails to intersect with a domain limitation imposed by the additional constraints. In such cases, the CSP solver can immediately discard the abstract solution in question, and thus avoid wasting time on exploration of a barren part of the solution space.

Although embodiments of the present invention are described herein with particular reference to generation of test cases for circuit evaluation, the principles of the present invention may likewise be used in other applications of CSP solving. Furthermore, although these embodiments use only a single partitioning of the variables into first and second sets, multiple partitions may alternatively be used to generate a hierarchy of abstract solutions, leading finally to the concrete solutions.

There is therefore provided, in accordance with an embodiment of the present invention, a method for modeling a target system, including: defining a constraint satisfaction problem (CSP) that characterizes the target system in terms of a set of variables, each having a respective input domain, and initial constraints applicable to the variables; partitioning the variables into at least first and second sets; finding an abstract solution to the CSP including a given assignment of the variables in the first set; computing a reduced domain of at least one of the variables in the second set that is compatible with the abstract solution; determining a redundant constraint on the abstract solution responsively to the reduced domain; and finding a concrete solution to the CSP, using the abstract solution and the redundant constraint.

Typically, finding the concrete solution includes finding multiple concrete solutions based on the abstract solution, each of the concrete solutions including a specific assignment of the variables in the second set that is compatible with the given assignment of the variables in the first set.

In disclosed embodiments, finding the abstract solution includes finding multiple abstract solutions for different, respective assignments of the variables in the first set, and determining the redundant constraint includes finding respective redundant constraints for the multiple abstract solutions. Typically, finding the multiple abstract solutions includes pruning a solution space of the CSP so as to eliminate one or more of the assignments of the variables in the first set.

In some embodiments, defining the CSP includes imposing at least one additional constraint so as to define a concrete CSP, and finding the concrete solution includes applying both the respective redundant constraints and the at least one additional constraint to each of the multiple abstract solutions. Typically, applying both the respective redundant constraints and the at least one additional constraint includes iterating over respective domains of the variables in the second set that satisfy both the respective redundant constraints and the at least one additional constraint in order to find the concrete solution. In some cases, applying both the respective redundant constraints and the at least one additional constraint includes determining for at least one of the abstract solutions that at least one of the respective domains of the variables in the second set that satisfy both the respective redundant constraints and the at least one additional constraint is empty, and eliminating the at least one of the abstract solutions.

In a disclosed embodiment, computing the reduced domain includes eliminating one or more values from the respective input domain of the at least one of the variables in the second set, typically by applying arc consistency to a network of the constraints.

In disclosed embodiments, defining the CSP includes imposing at least one additional constraint so as to define a concrete CSP, and finding the concrete solution includes applying both the redundant constraint and the at least one additional constraint to the abstract solution. Typically, applying both the redundant constraint and the at least one additional constraint includes eliminating the abstract solution if the at least one additional constraint is incompatible with the redundant constraint.

In some embodiments, the target system has a structure and one or more inputs, and defining the CSP includes defining first variables corresponding to the structure of the target system and second variables that are characteristic of the inputs to the target system, and finding the concrete solution includes finding values of the second variables so as to determine the inputs to be made to the target system. Typically, partitioning the variables includes placing the first variables in the first set and the second variables in the second set.

Additionally or alternatively, finding the values of the second variables includes generating input values so as to test the target system. In one embodiment, the target system includes an electronic system including a processor, and generating the input values includes determining parameters of a command to be input to the processor, typically for testing a design of the electronic system using the command. The first variables may define components of the electronic system, a configuration of the components, and one or more interactions among the components.

In another embodiment, the target system includes a mechanical system, and one or more of the variables correspond to control parameters of a mechanical system, and finding the concrete solution includes generating a command to control the mechanical system based on values of the one or more of the variables.

In yet another embodiment, one or more of the variables correspond to features of an image containing visual information, and finding the concrete solution includes identifying an object in the image based on the features.

In still another embodiment, one or more of the variables correspond to a natural language input, and finding the concrete solution includes parsing the natural language, responsively to values of the one or more of the variables, so as to interpret the language.

In a further embodiment, one or more of the variables correspond to characteristics of a condition, and finding the concrete solution includes determining a diagnosis of the condition based on values of the one or more of the variables.

In an additional embodiment, one or more of the variables correspond to characteristics of resources whose use is to be scheduled, and finding the concrete solution includes scheduling the use of the resources responsively to values of the one or more of the variables.

There is also provided, in accordance with an embodiment of the present invention, apparatus for modeling a target system, including a constraint satisfaction problem (CSP) solver, which is arranged to receive a definition of a CSP that characterizes the target system in terms of a set of variables, each having a respective input domain, and initial constraints applicable to the variables, the solver being further arranged to partition the variables into at least first and second sets, to find an abstract solution to the CSP including a given assignment of the variables in the first set, to compute a reduced domain of at least one of the variables in the second set that is compatible with the abstract solution, to determine a redundant constraint on the abstract solution responsively to the reduced domain, and to find a concrete solution to the CSP, using the abstract solution and the redundant constraint.

There is additionally provided, in accordance with an embodiment of the present invention, a computer software product, including a computer-readable medium in which program instructions are stored, which instructions, when read by a computer, cause the computer to accept a definition of a constraint satisfaction problem (CSP) that characterizes a target system in terms of a set of variables, each having a respective input domain, and initial constraints applicable to the variables, and further cause the computer to partition the variables into at least first and second sets, to find an abstract solution to the CSP including a given assignment of the variables in the first set, to compute a reduced domain of at least one of the variables in the second set that is compatible with the abstract solution, to determine a redundant constraint on the abstract solution responsively to the reduced domain, and to find a concrete solution to the CSP, using the abstract solution and the redundant constraint.

FIG. 1 is a block diagram that schematically illustrates a system 20 for automatic test-case generation, in accordance with a preferred embodiment of the present invention. System 20 is built around a test generator 22, which receives a definition 24 of a target system and a specific set of test requirements 26 to be applied to the target system. Definition 24 is typically expressed in terms of a set of variables and a network of constraints to be applied to those variables. Test requirements 26 typically comprise additional constraints, such as domain limitations, to be applied by generator 22 in producing test cases 28. The test requirements may be input in various forms, for example, in the form of a user-generated test template, as described hereinbelow. Generator 22 finds test cases 28 by solving the constraint network. In other words, each test case found by generator 22 is a (random) concrete solution to a CSP, giving values of the variables that satisfy all of the constraints. For this purpose, generator 22 uses methods of partitioned CSP solving, as described in detail hereinbelow.

In one embodiment of the present invention, by way of example, the variables provided by system definition 24 comprise possible inputs to a hardware device or software program under development. These inputs are typically instructions, addresses and possibly other properties that would be input to the device or program in the course of actual operation. Generator 22 uses test requirements 26 provided by the operator, together with constraints that it computes automatically itself, to determine test cases 28: combinations of the instructions and addresses to use as test inputs to the device. These inputs may then be applied to the device or program itself, or (as shown in FIG. 1) to a test execution system 30, such as a simulator for pre-production verification of the design of the device or program.

Typically, generator 22 comprises a general-purpose or dedicated computer, programmed with suitable software to serve as a CSP solver (?), so as to carry out the functions described herein. The software may be supplied to the computer in electronic form, over a network or communication link, for example, or it may be provided on tangible media, such as CD-ROM or DVD. Further aspects of the use of CSP solving in automatic test-case generation are described in U.S. patent application Ser. No. 09/788,152, filed Feb. 16, 2001 (published as US 2002/0169587 A1), which is assigned to the assignee of the present patent application and whose disclosure is incorporated herein by reference.

Although the embodiments described hereinbelow relate specifically to test-case generation, the principles of the present invention may be applied in solving a wide range of other types of constraint satisfaction problems. The CSP solver that is embodied in generator 22 may be adapted, either in the configuration of a stand-alone computer or integrated with other input and output devices, to carry out substantially any function that can be associated with a constraint network. Some examples of such functions are listed in the Background of the Invention. Exemplary applications include controlling a robot based on sensor inputs; analyzing visual or spatial information to identify and characterize objects in an image; parsing natural language input to interpret its meaning; suggesting medical diagnoses based on symptoms and test results; determining resource allocations and scheduling; belief maintenance; temporal reasoning; graph problems; and design of floor plans, circuits and machines. Other applications will be apparent to those skilled in the art.

Figure 2:
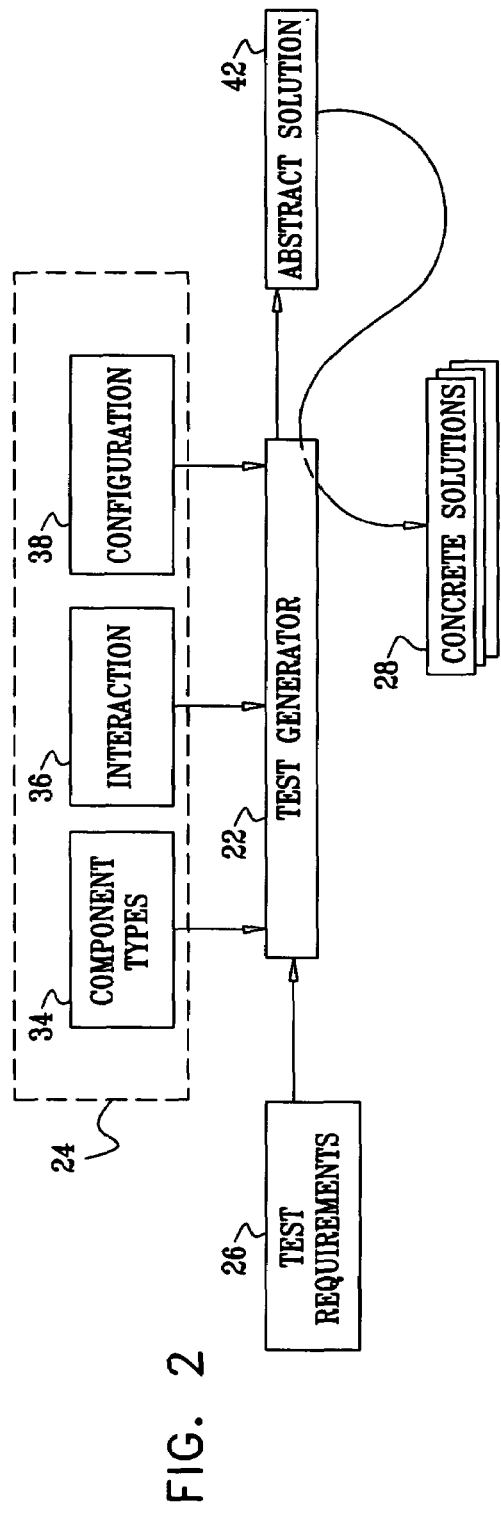
FIG. 2 is a block diagram showing functional details of the system of FIG. 1, in accordance with an embodiment of the present invention.

FIG. 2 is a block diagram that schematically shows functional details of system 20, in accordance with an embodiment of the present invention. The overall organization of system definition 24 and test requirements 26 that is shown in FIG. 2 is similar to that of the X-Gen test-case generator developed by International Business Machines Corp. (Armonk, N.Y.). X-Gen is described by Emek et al., in "X-Gen: A Random Test-Case Generator for Systems and SoCs," *IEEE International High Level Design Validation and Test Workshop* (Cannes, France, 2002), which is incorporated herein by reference.

Figure 3:
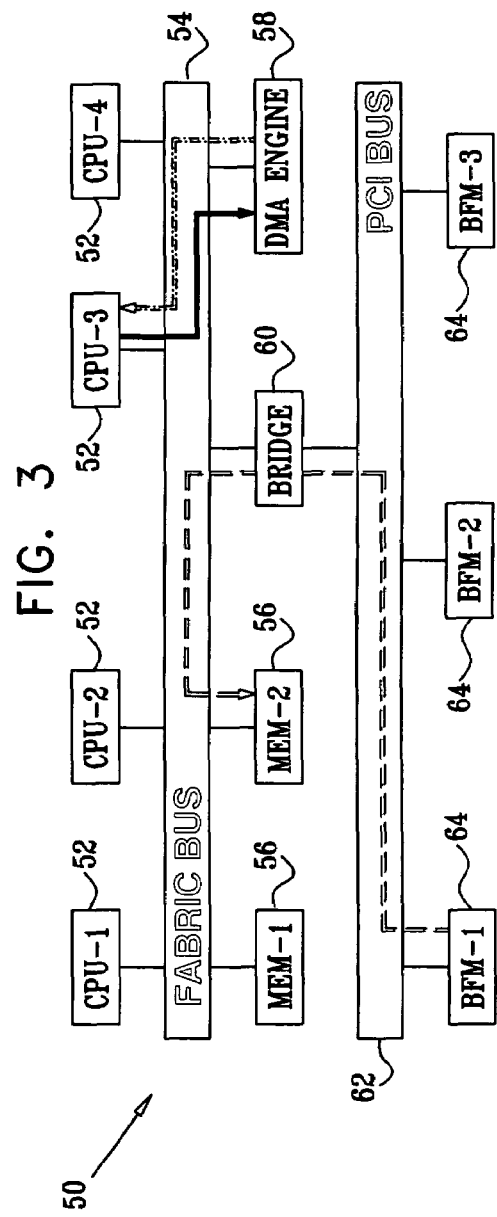
FIG. 3 is a block diagram that schematically illustrates a circuit interaction that is modeled by a CSP, in accordance with an embodiment of the present invention.

As shown in FIG. 2, system definition 24 is expressed in terms of component types 34 and interactions 36 between the components. The component types describe the types of hardware components that may be used in the system under test. Some examples, including processors, fabric bus, memory and BFM (bus functional model), are shown in FIG. 3. Each type may have one or more instances, such as CPU-1, CPU-2, etc, in a given design. Each component is modeled by constraints that describe its behavior in terms of its external interfaces and its internal state. Interactions 36 describe the way components interact with one another, in terms of constraints on the components that carry out the interactions. For example, a "load" interaction between a central processing unit (CPU) component and a memory component may be constrained to access addresses that are aligned to a four-byte boundary. Component types 34 and their interactions 36 are typically the same for many different circuit designs that may be tested using system 20. A configuration 38 defines the topology of the components (i.e., the connections between the components in a given design), as well as other component properties, such as the address space of a memory component.

FIG. 3 is a block diagram that schematically illustrates a circuit model 50 in which an interaction may be tested using system 20. The interaction in this example is a direct memory access (DMA) process, which is invoked by a CPU 52 in a multiprocessor computer. The interaction is broken into several acts (stages), shown by arrows in the figure connecting the participating components:

1. CPU 52 writes a command to a DMA engine 58 by executing a series of store instructions via a fabric bus 54 to a doorbell register of the DMA engine.
2. The DMA engine invokes a data transfer from an external component (represented by a BFM 64) via a Peripheral Component Interface (PCI) bus 62 and a bridge 60 to a memory 56.
3. DMA engine 58 sends an interrupt via bus 54 to CPU 52 to indicate that the data transfer has been completed.

Each act is thus represented in terms of the component actors and additional constraints on the acts, such as the data values to be written and the addresses to which they may be written. Each of the acts, as well as the entire interaction, may be tested using test cases 28 that are generated by CSP solving in test generator 22.

Returning now to FIG. 2, a user of test generator 22 typically specifies test requirements 26, indicating the types of interactions to exercise and the ranges of variable values to use. The user may input this information in the form of a test template. The above-mentioned article by Emek et al. describes a user interface that may be used in generating a "request file," which serves as the template. For example, the template might specify that generator 22 generate test cases 28 to exercise the data cache of a processor by means of a series of double-word store and load instructions. The template may also specify a certain range of addresses to which the data are to be stored and/or from which the data should be loaded. System definition 24 in this case describes the load instruction in terms of a set of variables representing parameters such as the address, length and target address of the load, with certain input domains defined by component models 34 and configuration 38. The template in this example may specify an additional limitation, or constraint, on the input domain of the address variable.

The user may generate multiple templates (i.e., different test requirements 26), which test the load or store operation of the target system represented by system definition 24 in different ways. Generator 22 solves the concrete CSP that results from combining system definition 24 with each set of test requirements 26 in order to derive test cases 28. In other words, each different template gives rise to a different concrete CSP, which is solved by generator 22 to give one or more test cases that satisfy the constraints of definition 24 and requirements 26 for each case. The model configuration and the basic load or store interaction that is to be tested by each test case (as embodied in system definition 24) are common to all the test cases, so that all the concrete CSPs share the same basic structure. Therefore, at least the fixed part of the CSP that is defined by system definition 24 remains the same from one concrete CSP to the next. A certain constraint or constraints, however—typically constraints on the input domains of certain variables—differ among the different concrete CSPs.

Test generator 22 takes advantage of the recurrence of this fixed part of the CSP over multiple concrete CSPs in order to reduce the burden of computation involved in solving each separate concrete CSP. For this purpose, the CSP variables are partitioned into two sets, a first, "abstract" set and a second, "concrete" set. The choice of how to partition variables into "abstract" and "concrete" sets may be made heuristically by the user of the CSP solver in each case, depending on the characteristics of the problem being modeled by the CSP. In general, the variables selected to be in the "abstract" set are those that have the greatest impact on the structure of the concrete CSP. In electronic devices such as those modeled by system 20, for example, the "abstract" variables are those that define the components participating in an interaction, while the variables that specify addresses, data, and other properties are "concrete" variables.

Alternatively, other criteria may be used in determining how to partition the CSP variables. Furthermore, the variables may be partitioned into a hierarchy of three or more sets, with one or more intermediate partitions between the "most abstract" variables and the concrete variables. Although in the present embodiment, the variables are partitioned into only two sets, the methods described hereinbelow may be extended in a straightforward manner to extend over multiple partitions in a hierarchical manner.

Test generator 22 takes advantage of the partitioning of the variables to solve the concrete CSPS in two phases. First, in a "static" phase, the test generator solves the partial CSP represented by the abstract variables, referred to herein as the "abstract CSP," to find abstract solutions 42. In the example shown in FIG. 2, the fixed system definition 24 is used in finding abstract solutions 42, but the variable test requirements 26 are not. Then, in a "dynamic" phase, the test generator uses the abstract solutions in deriving concrete solutions 28 to the full, concrete CSPs, including the added constraints of test requirements 26. The knowledge gained by the CSP solver in the static phase is used to avoid duplication of effort in solving multiple concrete CSPs. A methodology for CSP solving using this static/dynamic partitioning technique is described hereinbelow.

Figure 4A:
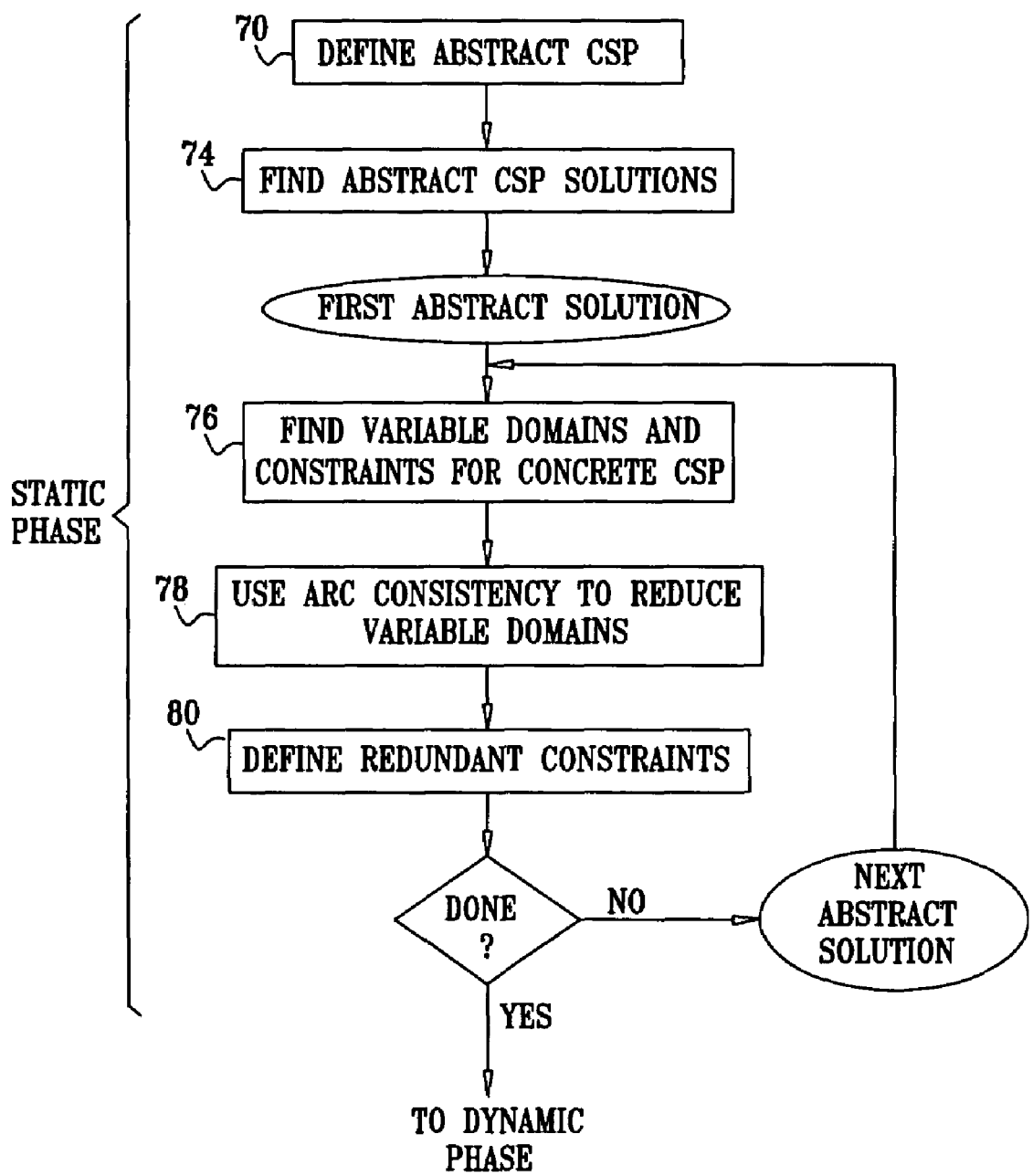
FIG. 4A is a flow chart that schematically illustrates a static phase in a method for CSP solving, in accordance with an embodiment of the present invention.

FIG. 4A is a flow chart that schematically illustrates a static phase in a method for CSP solving, in accordance with an embodiment of the present invention. This method is applied by test generator 22 in generating abstract solutions 42 and concrete solutions that specify test cases 28 in system 20. For purposes of simplicity and clarity of understanding, however, the method will be illustrated hereinbelow using the following exemplary CSP:

1. Variables: a, b, x, y, z.
2. Domains:
   a. Domain(a): $\{1,2\}$
   b. Domain(b): $\{1,2\}$
   c. Domain(x): $\{10,11,12,20,21,22\}$
   d. Domain(y): $\{10,11,20,21\}$
   e. Domain(z): $\{10,11,12,20,21,22\}$
3. Constraints:

a. $a = 2 \rightarrow b \neq 2$ b. $(a = 1 \wedge b = 1) \rightarrow \begin{bmatrix} x \in \{10, 11, 12\} \\ y \in \{10, 11\} \\ z \in \{10, 11, 12\} \\ x = y \\ z > y \end{bmatrix}$ c. $(a = 2 \wedge b = 1) \rightarrow \begin{bmatrix} x \in \{20, 21, 22\} \\ y \in \{11, 20\} \\ z \in \{10, 11, 12\} \\ z > x - 10 \\ y \neq z \end{bmatrix}$ d. $(a = 1 \wedge b = 2) \rightarrow \begin{bmatrix} x \in \{10, 11, 12\} \\ y \in \{10, 21\} \\ z \in \{20, 21, 22\} \\ x = y \vee y = z \\ z \neq 22 \end{bmatrix}$ It should be understood that although the solutions to this CSP may appear to be trivial, in an actual CSP, such as a CSP representing an electronic circuit in system 20, there are typically hundreds of variables, and corresponding numbers of constraints.

To begin the process of solving the CSP in question, the abstract CSP is defined at an abstract definition step 70. In the example above, it can be seen that variables a and b have the greatest impact on the structure of the CSP, since they determine the constraints that are imposed on the other variables in the problem. Therefore, the abstract CSP is taken to contain just these two variables, each with an input domain of $\{1,2\}$. The only constraints in the abstract CSP are those relating to the abstract variables themselves. In this case, the constraint is $a=2 \rightarrow b \neq 2$.

The CSP solver iterates over the domains of the abstract variables to find the abstract CSP solutions, at an abstract solving step 74. In the course of finding the abstract solutions, the solution space of the CSP may optionally be pruned to reduce its size. Methods of CSP pruning that may be used at this step are known in the art. Some pruning methods are described, for instance, by Kumar, in "Algorithms for Constraint Satisfaction Problems: A Survey," *AI Magazine* 13:1 (1992), pages 32-44, which is incorporated herein by reference. Pruning at step 72 is used in an attempt to avoid the exponential explosion of the Cartesian product of the domains of the variables in the abstract CSP. In the present example, pruning can be used to eliminate the non-existent solution $\{a,b\}=\{2,2\}$. The abstract solutions to the exemplary CSP given above are listed in the leftmost column of Table I below. In this case, the CSP solver finds the abstract solutions $\{1,1\}$, $\{2,1\}$ and $\{1,2\}$.

TABLE I

ABSTRACT CSP SOLUTIONS AND REDUNDANT CONSTRAINTS

| Abstract CSP solution | Concrete CSP: Initial domains | Concrete CSP: constraints | Concrete CSP: Domains after arc consistency |
|---|---|---|---|
| a = 1; b = 1 | $x \in \{10, 11, 12\}$ $y \in \{10, 11\}$ $z \in \{10, 11, 12\}$ | $x = y$ $z > y$ | $x \in \{10, 11\}$ $y \in \{10, 11\}$ $z \in \{11, 12\}$ |
| a = 2; b = 1 | $x \in \{20, 21, 22\}$ $y \in \{20, 11\}$ $z \in \{10, 11, 12\}$ | $z > x - 10$ $y \neq z$ | $x \in \{20, 21\}$ $y \in \{20, 11\}$ $z \in \{11, 12\}$ |
| a = 1; b = 2 | $x \in \{10, 11, 12\}$ $y \in \{10, 21\}$ $z \in \{20, 21, 22\}$ | $x = y \vee y = z$ $z \neq 22$ | $x \in \{10, 11, 12\}$ $y \in \{10, 21\}$ $z \in \{20, 21\}$ |

The CSP solver now iterates over the possible abstract solutions found at step 74, in order to find the domains of the remaining variables (i.e., the variables in the concrete set) and the constraints applicable to these variables for each of the abstract solutions, at a concrete CSP definition step 76. The results of this step are shown in the two middle columns of Table I. As illustrated in the table, in each abstract solution the domains of the concrete variables may be reduced, relative to the full input domains, and only a subset of all the system constraints may be applicable.

The domains of the concrete variables in each concrete CSP may be further reduced by processing the concrete CSP so as to eliminate values that cannot participate in any actual solution, at a domain reduction step 78. The result of this stage is a data structure, shown in the rightmost column of Table I, that maps each solution of the abstract CSP to a reduced domain for the variables of the concrete CSP. The reduced domain contains the supporting values of the concrete variables for each abstract solution. For example, the abstract solution a=b=1 requires that for the concrete variables x and y, x=y. Since the domain of y does not contain the value 12, x cannot take this value in any solution of the concrete CSP. The value 12 is therefore removed from the domain of x, as shown in the right column of the table.

The reduction of variable domains at step 78 can conveniently be achieved by imposing arc consistency on the concrete CSP. Additionally or alternatively, other domain reduction (pruning) techniques may be used at this step. For example, a singleton consistency technique may be used, such as that described by Prosser et al., in "Singleton Consistencies," *Principles and Practice of Constraint Programming—Sixth International Conference* (CP2000, Singapore, 2000), pages 353-368, which is incorporated herein by reference.

The arc consistency approach views the constraint network as a hypergraph, having a node for each variable and a hyperedge for each constraint. These hyper-edges are referred to as arcs, wherein the members of such an arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc. If every arc in the hypergraph is consistent, then the network is said to be arc-consistent.

Algorithmic solutions for CSPs based on maintaining arc consistency were introduced by Mackworth in an article entitled "Consistency in Networks of Relations," in *Artificial Intelligence* 8 (1977), pages 99-118, which is incorporated herein by reference. Arc consistency algorithms are based on the observation that given variables $v_1$ and $v_2$, with discrete domains $D_1$ and $D_2$, if $x \in D_1$ and there is no $y \in D_2$ that satisfies a given constraint $P_{ij}$ imposed on $v_1$ and $v_2$, then x can be deleted from $D_1$. This basic action of arc consistency algorithms is embodied in the Boolean procedure "REVISE":

```
procedure REVISE((i,j)):
begin
   DELETE ← false
   for each x ∈ D_i do
   if there is no y ∈ D_j such that P_ij(x,y) then
      begin
         delete x from D_i;
         DELETE ← true
      end
   return DELETE
end
```

It is also necessary, of course, that the variables have single node consistency, i.e., that they satisfy any applicable unary predicates in the constraint network. Mackworth also defines a simple procedure NC(i) for testing single node consistency.

Whenever REVISE is successful (i.e., when it results in reducing the domain of one of the nodes of the arc), it is necessary to determine whether the other arcs of the graph (G) are still consistent, and to REVISE their node domains as required to maintain consistency. Mackworth points out that it is not necessary to apply REVISE to all of the arcs in the graph, but only to those arcs for which the result of applying REVISE could possibly be changed from false to true. Thus, the arcs are maintained in a queue (Q), and the following algorithm is used to reapply REVISE to any of the arcs in the queue for which it is appropriate:

```
begin
   for i ← 1 until n do NC(i);
   Q ← {(i,j)|(i,j) ∈ arcs(G), i ≠ j}
   while Q not empty do
      begin
      select and delete any arc (k,m) from
      Q;
            if REVISE ((k,m)) then Q ← Q ∪
      {(i,k)|(i,k) ∈ arcs (G), i ≠ k, i ≠ m}
            end
   end
```

Arc consistency algorithms may also be generalized to non-binary constraints. Methods for representing and solving CSPs based on maintaining arc consistency are further described in the above-mentioned U.S. patent application Ser. No. 09/788,152.

The data structure created at step 78 is used to define redundant constraints, at a constraint definition step 80. The redundant constraints impose limitations drawn from the reduction of the domains of some of the concrete variables, as derived from each of the abstract solutions. In the example shown in Table I, the redundant constraints have the form of domain limitations on the variables x, y and z for each abstract solution. Alternatively, the redundant constraints may take other, more complex forms. The redundant constraints are applied subsequently in solving the concrete CSPs in the dynamic phase, as described below.

Figure 4B:
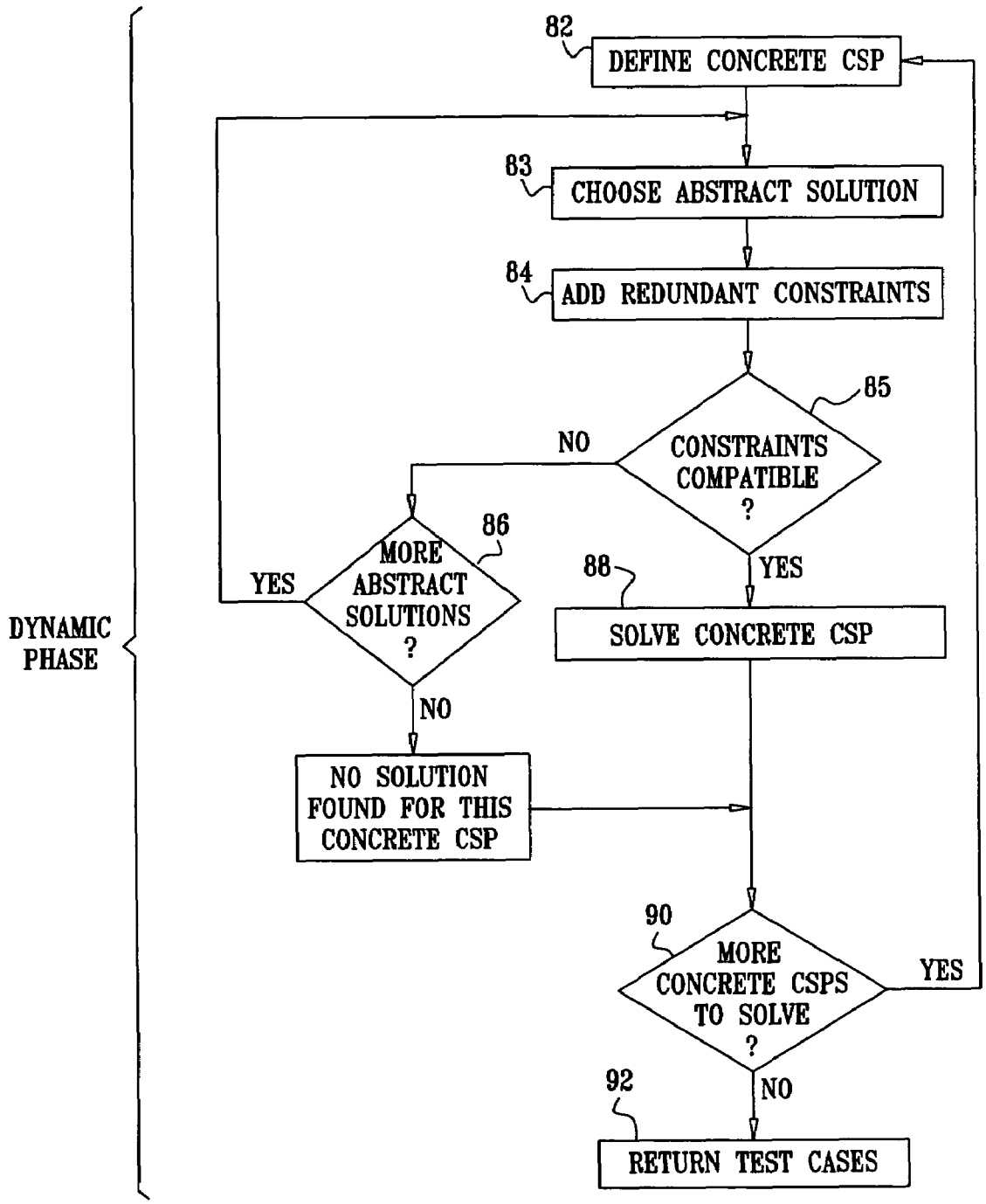
FIG. 4B is a flow chart that schematically illustrates a dynamic phase in a method for CSP solving, in accordance with an embodiment of the present invention.

FIG. 4B is a flow chart that schematically illustrates a dynamic phase in a method for CSP solving, in accordance with an embodiment of the present invention. In this phase, the redundant constraints found in step 80 of the static phase may be used repeatedly in finding solutions to multiple concrete CSPs. In order to find these concrete solutions, a concrete CSP is specified, at a concrete definition step 82. Typically, each concrete CSP to be solved is defined by placing an additional constraint or constraints on one or more of the variables, such as a limitation on the input domain of one or more of the concrete variables. For example, in the case of test-case generation in system 20, as noted above, the concrete CSP is typically specified by adding test requirements 26, in the form of a template submitted by a user of the system, to system definition 24, which is shared by all the concrete CSPs.

To begin solution of the concrete CSP, the CSP solver of test generator 22 selects one of the abstract solutions that was found in the static phase, at an abstract selection step 83. Based on this selection, the CSP solver adds the applicable redundant constraints, at a constraint addition step 84. In other words, the CSP solver constructs each concrete CSP that is to be solved by taking one of the abstract solutions, with its given constraints on the concrete variables as found at step 76, and adding to it the redundant constraints that were found at step 80 and the additional constraints defined at step 82.

The CSP solver checks the set of constraints to verify that they are mutually compatible, at a compatibility checking step 85. At this step, the redundant constraints may immediately eliminate certain abstract solutions, which cannot lead to valid solutions of this concrete CSP. For example, the additional constraint defined for a certain concrete CSP at step 82 may limit the domain of the variable x in Table I above to the value 10. In this case, the redundant constraint will eliminate the abstract solution {a,b}={2,1} from further consideration, since x cannot take the value 10 in this abstract solution. The CSP solver will then check whether there are any further abstract solutions that may be used, at a failure checking step 86. If there are further abstract solutions that remain to be tried, the CSP solver returns to choose another abstract solution at step 83. Alternatively, there may be some concrete CSPs that do not comply with any abstract solution. For example, referring again to Table I, a concrete CSP that attempts to limit x to the value 22 will be found a priori to have no valid solutions. In this case, the CSP solver moves on to the next concrete CSP, without providing a solution to the present one.

When the constraints are found to be compatible at step 85, the CSP solver then solves the concrete CSP using the selected abstract solution, at a concrete solution step 88. The CSP solver intersects the variable domain found at step 78 (as in the rightmost column of Table I) with the variable domain that was defined for the current concrete CSP at step 82. As noted above, if the result of this intersection is empty for any of the concrete variables, the given assignment of the concrete variables is not valid for this abstract solution. A successful concrete solution that is generated by test generator 22, on the other hand, provides the variable values for a test case 28 that can be executed by test execution system 30. A given concrete CSP may be solved to find multiple test cases, if desired.

After solving each concrete CSP at step 88 (or passing over a concrete CSP for which no solution is found at step 86), test generator 22 checks to determine whether there are any more concrete CSPs to be solved based on the current abstract CSP (as defined at step 70), at a further checking step 90. If so, the test generator returns to step 82 in order to cycle through the dynamic phase again. After all the concrete CSPs have been solved, the test generator outputs the test cases, at a test return step 92.

Formally, the redundant constraints are applied in finding the concrete solutions as follows:

The redundant constraints are given by a map from the assignments of the abstract variables to the domains of the concrete variables—M: $(a_1, a_2, \ldots a_n) \mapsto (D_{c1}, D_{c2}, \ldots, D_{cm})$, wherein $a_i$ is a value in the domain of the abstract variable $A_i$, and $D_{cj}$ is a (reduced) domain for the concrete variable $C_j$.

The domains of all the concrete variables that are specified for the current concrete CSP are enumerated as $(D'_{c1}, D'_{c2}, \ldots, D'_{cm})$.

The CSP solver receives as input a given assignment of the variables of the abstract CSP: $(a'_1, a'_2, \ldots a'_n)$ The CSP solver determines a Boolean value (true/false), indicating whether the given assignment to the variables of the abstract CSP is a possible solution to the concrete CSP. Specifically, the algorithm is:

1. From the map M, retrieve the concrete domains $(D_{c1}, D_{c2}, \ldots, D_{cm})$ for the assignment $(a'_1, a'_2, \ldots a'_n)$.
2. for i=1 to m:

if $D_{ci} \cap D'_{ci} = \phi$ return false 3. return true

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for modeling a target system, comprising:
   defining a constraint satisfaction problem (CSP) that characterizes the target system in terms of a set of variables, each having a respective input domain, and initial constraints applicable to the variables;
   partitioning the variables into at least first and second sets;
   finding an abstract solution to the constraint satisfaction problem comprising a given assignment of the variables in the first set;
   computing a reduced domain of at least one of the variables in the second set that is compatible with the abstract solution;
   determining a redundant constraint on the abstract solution responsively to the reduced domain;
   finding a concrete solution to the constraint satisfaction problem, using the abstract solution and the redundant constraint in forming a model of said target system and assigning a value to each variable from said set satisfying all the constraints, wherein said target system is a system for employing said concrete solution in modeling the target system for use in:
   control of a robotic arm in a mechanical system, wherein one or more of the variables correspond to control parameters of the mechanical system, and finding the concrete solution includes generating a command to control the mechanical system based on values of the one or more of the variables; and
   wherein finding the concrete solution comprises finding multiple concrete solutions based on the abstract solution, each of the concrete solutions comprising a specific assignments of the variables in the second set that is compatible with the given assignment of the variables in the first set; and
   wherein computing the reduced domain comprises applying arc consistency to a network of the constraints.

2. The method according to claim 1, wherein finding the abstract solution comprises finding multiple abstract solutions for different, respective assignments of the variables in the first set, and wherein determining the redundant constraint comprises finding respective redundant constraints for the multiple abstract solutions.

3. The method according to claim 2, wherein finding the multiple abstract solutions comprises pruning a solution space of the constraint satisfaction problem so as to eliminate one or more of the assignments of the variables in the first set.

4. The method according to claim 2, wherein defining the constraint satisfaction problem comprises imposing at least one additional constraint so as to define a concrete constraint satisfaction problem, and wherein finding the concrete solution comprises applying both the respective redundant constraints and the at least one additional constraint to each of the multiple abstract solutions.

5. The method according to claim 4, wherein applying both the respective redundant constraints and the at least one additional constraint comprises iterating over respective domains of the variables in the second set that satisfy both the respective redundant constraints and the at least one additional constraint in order to find the concrete solution.

6. The method according to claim 5, wherein applying both the respective redundant constraints and the at least one additional constraint comprises determining for at least one of the abstract solutions that at least one of the respective domains of the variables in the second set that satisfy both the respective redundant constraints and the at least one additional constraint is empty, and eliminating the at least one of the abstract solutions.

7. The method according to claim 1, wherein computing the reduced domain comprises eliminating one or more values from the respective input domain of the at least one of the variables in the second set.

8. The method according to claim 1, wherein defining the constraint satisfaction problem comprises imposing at least one additional constraint so as to define a concrete constraint satisfaction problem, and wherein finding the concrete solution comprises applying both the redundant constraint and the at least one additional constraint to the abstract solution.

9. The method according to claim 8, wherein applying both the redundant constraint and the at least one additional constraint comprises eliminating the abstract solution if the at least one additional constraint is incompatible with the redundant constraint.

10. The method according to claim 1, wherein the target system has a structure and one or more inputs, and wherein defining the constraint satisfaction problem comprises defining first variables corresponding to the structure of the target system and second variables that are characteristic of the inputs to the target system, and wherein finding the concrete solution comprises finding values of the second variables so as to determine the inputs to be made to the target system.

11. The method according to claim 10, wherein partitioning the variables comprises placing the first variables in the first set and the second variables in the second set.

12. The method according to claim 10, wherein finding the values of the second variables comprises generating input values so as to test the target system.

13. The method according to claim 12, wherein the target system comprises an electronic system comprising a processor, and wherein generating the input values comprises determining parameters of a command to be input to the processor.

14. The method according to claim 13, and comprising testing a design of the electronic system using the command.

15. The method according to claim 13, wherein the first variables define components of the electronic system, a configuration of the components, and one or more interactions among the components.

16. The method according to claim 1, wherein the target system comprises a mechanical system, and one or more of the variables correspond to control parameters of a mechanical system, and wherein finding the concrete solution comprises generating a command to control the mechanical system based on values of the one or more of the variables.

17. The method according to claim 1, wherein one or more of the variables correspond to features of an image containing visual information, and wherein finding the concrete solution comprises identifying an object in the image based on the features.

18. The method according to claim 1, wherein one or more of the variables correspond to a natural language input, and wherein finding the concrete solution comprises parsing the natural language, responsively to values of the one or more of the variables, so as to interpret the language.

19. The method according to claim 1, wherein one or more of the variables correspond to characteristics of a condition, and wherein finding the concrete solution comprises determining a diagnosis of the condition based on values of the one or more of the variables.

20. The method according to claim 1, wherein one or more of the variables correspond to characteristics of resources whose use is to be scheduled, and wherein finding the concrete solution comprises scheduling the use of the resources responsively to values of the one or more of the variables.

21. An apparatus for modeling a target system, comprising:
a constraint satisfaction problem (CSP) solver, which is receives a definition of a constraint satisfaction problem that characterizes the target system in terms of a set of variables, each having a respective input domain, and initial constraints applicable to the variables, the solver partitions the variables into at least first and second sets, finds an abstract solution to the constraint satisfaction problem comprising a given assignment of the variables in the first set, computes a reduced domain of at least one of the variables in the second set that is compatible with the abstract solution, determines a redundant constraint on the abstract solution responsively to the reduced domain, and finds a concrete solution to the constraint satisfaction problem, using the abstract solution and the redundant constraint in forming a model of said target system and assigning a value to each variable from said set satisfying all the constraints, wherein said target system is a system for employing said concrete solution in modeling the target system for use in control of a robotic arm in a mechanical system, wherein one or more of the variables correspond to control parameters of the mechanical system, and finding the concrete solution includes generating a command to control the mechanical system based on values of the one or more of the variables; and
wherein the solver is arranged to find multiple concrete solutions based on the abstract solution, each of the concrete solutions comprising a specific assignments of the variables in the second set that is compatible with the given assignment of the variables in the first set; and
wherein the solver is arranged to eliminate the one or more values by applying arc consistency to a network of the constraints.

22. A computer software product, comprising a computer-readable medium in which program instructions are stored, which instructions, when read by a computer, cause the computer to accept a definition of a constraint satisfaction problem (CSP) that characterizes a target system in terms of a set of variables, each having a respective input domain, and initial constraints applicable to the variables, and further cause the computer to partition the variables into at least first and second sets, to find an abstract solution to the constraint satisfaction problem comprising a given assignment of the variables in the first set, to compute a reduced domain of at least one of the variables in the second set that is compatible with the abstract solution, to determine a redundant constraint on the abstract solution responsively to the reduced domain, and to find a concrete solution to the constraint satisfaction problem, using the abstract solution and the redundant constraint in forming a model of said target system and assigning a value to each variable from said set satisfying all the constraints, wherein said target system is a system for employing said concrete solution in modeling the target system for use in control of a robotic arm in a mechanical system, wherein one or more of the variables correspond to control parameters of the mechanical system, and finding the concrete solution includes generating a command to control the mechanical system based on values of the one or more of the variables; and
wherein the instructions cause the computer to find multiple concrete solutions based on the abstract solution, each of the concrete solutions comprising a specific assignment of the variables in the second set that is compatible with the given assignment of the variables in the first set;
wherein the instructions causes the computer to eliminate the one or more values by applying arc consistency to a network of constraints.

23. The apparatus according to claim 21, wherein the solver is arranged to find multiple abstract solutions for different, respective assignments of the variables in the first set, and to find respective redundant constraints for the multiple abstract solutions.

24. The apparatus according to claim 21, wherein the solver is arranged to prune a solution space of the constraint satisfaction problem so as to eliminate one or more of the assignments of the variables in the first set.

25. The apparatus according to claim 21, wherein the solver is arranged to receive at least one additional constraint defining a concrete constraint satisfaction problem, and to apply both the respective redundant constraints and the at least one additional constraint to each of the multiple abstract solutions.

26. The apparatus according to claim 21, wherein the solver is arranged to iterate over respective domains of the variables in the second set that satisfy both the respective redundant constraints and the at least one additional constraint in order to find the concrete solution.

27. The apparatus according to claim 21, wherein the solver is arranged to eliminate at least one of the abstract solutions by determining with respect to the at least one of the abstract solutions that at least one of the respective domains of the variables in the second set that satisfy both the respective redundant constraints and the at least one additional constraint is empty.

28. The apparatus according to claim 21, wherein the solver is arranged to receive at least one additional constraint so as to define a concrete constraint satisfaction problem, and to apply both the redundant constraint and the at least one additional constraint to the abstract solution so as to find the concrete solution to the concrete constraint satisfaction problem; and wherein the solver is arranged to eliminate the abstract solution if the at least one additional constraint is incompatible with the redundant constraint.

29. The apparatus according to claim 21, wherein the target system has a structure and one or more inputs, and wherein the variables comprise first variables corresponding to the structure of the target system and second variables that are characteristic of the inputs to the target system, and wherein the solver is arranged to find the concrete solution so as to set values of the second variables that determine the inputs to be made to the target system; and wherein the solver is arranged to partition the variables so that the first variables are in the first set and the second variables are in the second set.

30. The apparatus according to claim 21, wherein the solver is arranged to determine the inputs so as to test the target system;

wherein the target system comprises an electronic system comprising a processor, and wherein the solver is arranged to determine parameters of a command to be input to the processor responsively to the values of the second variables; and wherein the first variables define components of the electronic system, a configuration of the components, and one or more interactions among the components.

* * * * *